Jan. 18, 1949.                L. E. LA BRIE                2,459,562
                                CUP WASHER
                            Filed Aug. 27, 1945
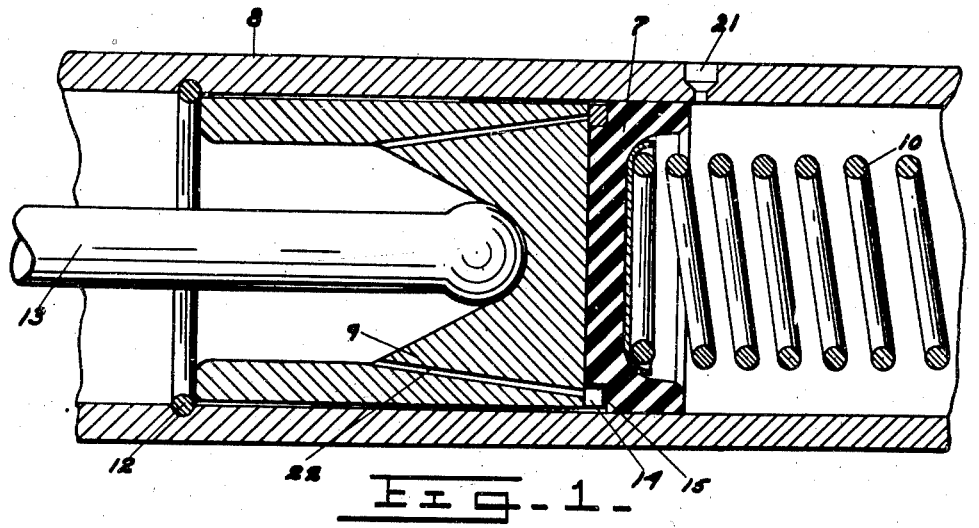
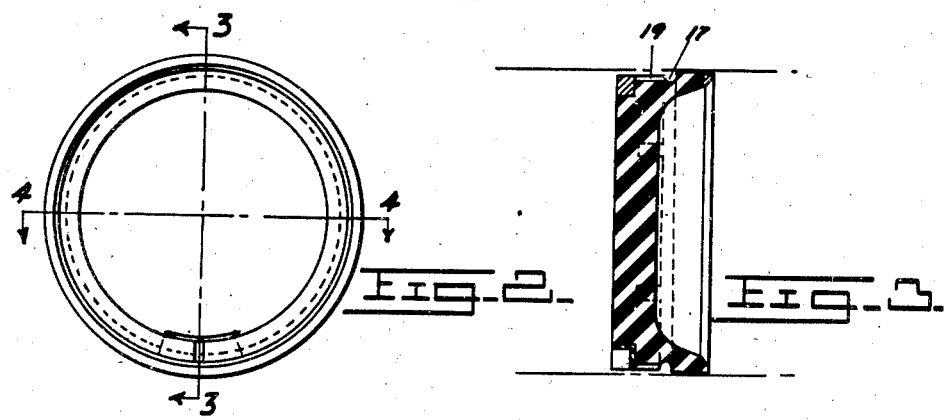
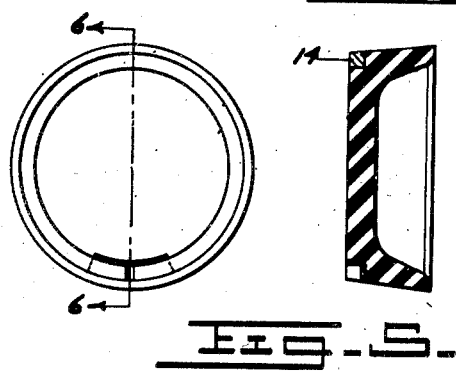
INVENTOR.
LUDGER E. LaBRIE
BY
Clifford C. Bradbury
ATTORNEY Patented Jan. 18, 1949

2,459,562

UNITED STATES PATENT OFFICE 2,459,562

CUP WASHER

Ludger E. La Brie, Detroit, Mich., assignor to Hydraulic Brake Company, Detroit, Mich., a corporation of California Application August 27, 1945, Serial No. 612,944

4 Claims. (Cl. 309—33)

My invention relates to cup washers for high pressure fluid cylinders such as are used in hydraulic brake systems for trucks and like vehicles.

Cup washers for hydraulic brake systems are preferably made of rubber or some rubber composition because such material is not substantially dissolved or softened by brake fluid which contains a mixture of castor oil and alcohol. It is essential that the rubber of which the cup washer is made shall be soft enough to flex freely against the cylinder wall so as to not only seal against the flow of brake fluid as the piston moves in the compression direction, but also so as to wipe the cylinder wall substantially clean, leaving only the very thinnest film of oil for the lubrication of the piston.

The pressure developed in the cylinders of some braking systems reaches several thousand pounds per square inch and when the piston moves forwardly under this pressure, there is a tendency for the rubber of the cup washer to adhere to the cylinder wall and be forced by the movement and high pressure to flow into the space between the piston and the cylinder wall. When this happens, pieces of rubber are torn loose from the cup washer until eventually the cup washer is destroyed.

It is impracticable from a manufacturing stnadpoint to fit the pistons to the cylinders with such accuracy as to leave no crack into which the rubber may be forced, partly because of manufacturing tolerances and partly because of wear which inevitably takes place between the piston and the cylinder during use.

In accordance with my invention, the cup washer is formed with a circumferential, rectangular cross-section groove around the base portion into which a split ring of metal is introduced. This ring has a normal size slightly less than the internal diameter of the cylinder so that a very slight pressure on its inner periphery due to enlarging of the rubber base under fluid pressure will cause the ring to press firmly against the cylinder throughout their contacting circumferences. The gap between the ends of the split ring is covered by a thin metal angle attached to one end of the ring to prevent the intrusion of the rubber under high pressure.

My invention is illustrated in the accompanying drawings in which two well known forms of rubber cup washers are illustrated, and in which Fig. 1 is a cross-section of a portion of a hydraulic brake master cylinder with its piston, push rod, cup washer, return spring and split ring, all shown in their normal positions within the cylinder.

Fig. 2 is an elevation of a cup washer in the condition it assumes when not confined in a cylinder.

Fig. 3 is a section on the line 3—3 through the cup washer illustrated in Fig. 2.

Fig. 4 is a section on the line 4—4 through the cup washer illustrated in Fig. 2.

Fig. 5 is a modified form of cup washer, and

Fig. 6 is a section on the line 6—6 of Fig. 5.

Referring to Fig. 1, the cup washer 7 is shown circumferentially compressed within a cylinder 8 and having its flat base portion held against a piston 9 by a spring 10. The movement of the piston to the left is limited by a C-spring 12, and the movement of the piston to the right for compression purposes is brought about by the piston push rod 13. A metallic split ring 14 lies within a rectangular groove in the cup washer 7 and is of such normal size as to be contracted slightly away from the wall of the cylinder when no fluid pressure is applied to the cup washer 7. The gap between the ends of the metallic split ring 14 is covered by an angle member 15, silver soldered or otherwise, suitably attached to one end of the open ring 14.

In Figs. 2, 3 and 4, the cup washer is shown as provided with a groove 17 which extends circumferentially around the base of the lip of the cup, the washer being provided with ducts 19 in its external surface leading axially from the split ring to the groove 17. The ducts 19 and the groove 17 are for the purpose of aiding in the flow of brake fluid past the cup washer 7 when the piston and cup washer are moved in the non-compression direction by the spring 10.

The cup washer illustrated in Figs. 5 and 6 is of the type usually used in wheel cylinders rather than in master compression cylinders. In wheel cylinders there is no necessity for fluid to pass the cup washer under any condition, though the tendency for the base of the cup to be crowded into space around the piston is substantially the same as in the master cylinder. The split ring 14 in Figs. 5 and 6, however, may have a normal size such as to cause the ring to contact the inner wall of the cylinder when no pressure is applied to the rubber, since there is no necessity for fluid to pass the outside of the ring 14 under any condition. However, if the ring is slightly under the size of the cylinder, the cup will move more freely in the cylinder and the ring will enlarge under pressure of fluid to close the gap between the ring and the cylinder wall.

In operation, the piston 9 is moved toward the right by the movement of the push rod 13. After the lip of the cup 7 has passed the bleed hole 21, the brake fluid which occupies the entire space to the right of the cup washer 7 is placed under pressure which gradually increases as the piston 9 is moved further and further to the right. Only a slight amount of pressure is required to expand the base of the cup washer 7 within the ring 14 to such an extent as to cause the ends of the split ring to separate and the ring to enlarge until it presses firmly against the inner wall of the cylinder throughout their entire contacting circumferences. This expansion of the ring takes place long before the pressure of the fluid has increased to such a degree as would tend to force the rubber of the cup into the crack between the unexpanded ring 14 and the cylinder wall. Since the ring 14 is now pressed firmly against the wall through its circumference, no crack or opening is left into which the rubber of the cup washer may be squeezed even under very high fluid pressure. The angle member 15 is made of very thin metal and fits so closely against the ring 14 that the rubber of the cup washer is not intruded between the angle and the ring. When the spring 10 is permitted to return the piston 9 to its normal position more rapidly than the brake fluid can return to the right end of the cylinder 8, then brake fluid flows from the interior of the piston 9, through its ducts 22, around the outside of the now contracted split ring 14, and past the lip of the cup 7, the ducts 19 and 17 providing passageways for the brake fluid even if the rubber of the cup washer has become expanded through long use so that it normally fills the cylinder.

While I have shown and described my invention as applied to hydraulic braking equipment, it is to be understood that it is not limited thereto, and that it is not to be unduly limited to the exact form of either the ring or the cup washer illustrated in the drawings.

I claim:

1. In a fluid pressure braking system, a flexible cup washer having a lip of a size greater than the diameter of the cylinder in which it is to operate, a base portion having a normal diameter of less than that of the cylinder in which it is to operate, and a split ring surrounding a portion of the base of the flexible cup washer and having a normal diameter slightly less than the diameter of the cylinder in which it is to operate, the rubber of the cup washer being sufficiently yielding to expand the split ring against the cylinder wall under fluid pressure.

2. A cup washer for hydraulic brake master cylinders having a circumferential depression about the periphery of its base, a piston having fluid passages therethrough against which the cup abuts, and a metallic split ring within the depression in the cup washer having a normal external diameter enough less than the diameter of the cylinder in which the cup washer is to operate to permit a free flow of brake fluid between the ring and the cylinder wall when the pressure in the cup falls below that within the piston.

3. In a fluid pressure braking system, a flexible cup washer having a lip of a size greater than the diameter of the cylinder in which it is to operate, a base portion having a normal diameter of less than that of the cylinder in which it is to operate, and a split ring surrounding a portion of the base of the flexible cup washer and having a normal diameter slightly less than the diameter of the cylinder in which it is to operate, the rubber of the cup washer being sufficiently yielding to expand the split ring against the cylinder wall under fluid pressure and to permit the split ring to contract away from the cylinder wall when the fluid pressure drops below atmospheric pressure, and an angle plate completely covering two sides of the ring at the gap between the ends of the ring to prevent rubber from being forced into the gap.

4. In a fluid pressure braking system, a flexible cup washer having a lip of a size greater than the diameter of the cylinder in which it is to operate, a base portion having a normal diameter of less than that of the cylinder in which it is to operate, and a split ring surrounding a portion of the base of the flexible cup washer and having a normal diameter slightly less than the diameter of the cylinder in which it is to operate, the rubber of the cup washer being sufficiently yielding to expand the split ring against the cylinder wall under fluid pressure and to permit the split ring to contract away from the cylinder wall when the fluid pressure drops below atmospheric pressure, and an angle plate completely covering two sides of the ring at the gap between the ends of the ring to prevent rubber from being forced into the gap, one end of the angle plate being attached to one end of the ring and the other end of the ring being slidable in the angle plate.

LUDGER E. LA BRIE.

REFERENCES CITED

The following references are of record in the file of this patent:

UNITED STATES PATENTS

| Number | Name | Date |
|---|---|---|
| 1,612,038 | Miller | Dec. 28, 1926 |
| 1,612,039 | Miller | Dec. 28, 1926 |
| 1,867,656 | Cooper | July 19, 1932 |
| 2,015,585 | Bodenlos | Sept. 24, 1935 |
| 2,315,944 | Dick | Apr. 6, 1943 |
| 2,383,959 | Dick | Sept. 4, 1945 |
| 2,385,406 | Dayton | Sept. 25, 1945 |